(12) United States Patent
Kim (10) Patent No.: US 11,495,812 B2
(45) Date of Patent: Nov. 8, 2022

(54) METHOD OF MANUFACTURING MEMBRANE-ELECTRODE ASSEMBLY AND MEMBRANE-ELECTRODE ASSEMBLY MANUFACTURED USING THE SAME

(71) Applicants: Hyundai Motor Company, Seoul (KR); Kia Motors Corporation, Seoul (KR)

(72) Inventor: Yong Min Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 229 days.

(21) Appl. No.: 16/536,813

(22) Filed: Aug. 9, 2019

(65) Prior Publication Data
US 2020/0212467 A1    Jul. 2, 2020

(30) Foreign Application Priority Data
Dec. 26, 2018  (KR) .................... 10-2018-0169503

(51) Int. Cl.
*H01M 8/1004*    (2016.01)

(52) U.S. Cl.
CPC ................. *H01M 8/1004* (2013.01)

(58) Field of Classification Search
None
See application file for complete search history.

(56) References Cited

U.S. PATENT DOCUMENTS

| | | | |
|---|---|---|---|
| 6,524,736 B1* | 2/2003 | Sompalli | C25B 9/23 |
| | | | 429/535 |
| 2002/0055034 A1* | 5/2002 | Fukuda | H01M 4/8896 |
| | | | 502/101 |
| 2005/0214631 A1* | 9/2005 | Hirashige | H01M 4/8817 |
| | | | 429/450 |
| 2009/0280382 A1* | 11/2009 | MacKinnon | H01M 8/1023 |
| | | | 429/493 |

* cited by examiner

*Primary Examiner* — Eli S Mekhlin
(74) *Attorney, Agent, or Firm* — Fox Rothschild LLP (57) ABSTRACT

Disclosed are a method of manufacturing a membrane-electrode assembly and a membrane-electrode assembly manufactured using the same. The method includes forming a laminated structure, and treating the laminated structure, for example, by drying and heat treating. The laminated structure includes a release film, an anode layer, a porous support layer, and a cathode layer.

14 Claims, 5 Drawing Sheets

METHOD OF MANUFACTURING MEMBRANE-ELECTRODE ASSEMBLY AND MEMBRANE-ELECTRODE ASSEMBLY MANUFACTURED USING THE SAME

CROSS-REFERENCE TO RELATED APPLICATION

This application claims under 35 U.S.C. § 119(a) the benefit of priority to Korean Patent Application No. 10-2018-0169503 filed on Dec. 26, 2018, the entire contents of which are incorporated herein by reference.

FIELD

The present disclosure relates to a method of manufacturing a membrane-electrode assembly and a membrane-electrode assembly manufactured using the same.

BACKGROUND

A fuel cell may be formed by disposing separators (or bipolar plates) on both surfaces of a membrane-electrode assembly (MEA) and multiple fuel cells may be continuously arranged to form a fuel cell stack.

In particular, a membrane-electrode assembly, which is a major component of a fuel cell, commonly has a three-layered structure including a polymer electrolyte layer, an anode catalyst electrode layer formed on one surface of the polymer electrolyte layer, and a cathode catalyst electrode layer formed on the opposite surface of the polymer electrolyte layer. For instance, in the related arts, methods of manufacturing a membrane-electrode assembly having a three-layered structure may include decal transfer method and the direct coating method.

With regard to the decal transfer method, a catalyst electrode layer is formed by coating and drying a catalyst slurry on the surface of a release film, the release film formed with the catalyst electrode layer is stacked on each of both surfaces of a polymer electrolyte membrane layer, the catalyst electrode layer is transferred and bonded (laminated) to each of both surfaces of the polymer electrolyte membrane layer using a roll laminating process (thermal compression at a high temperature and a high pressure), and the release film is removed from the catalyst electrode layer, thereby manufacturing a membrane-electrode assembly having a three-layered structure. The decal transfer method may include respectively preparing a cathode, an anode and an electrolyte membrane layer and bonding these components to each other through thermal compression. However, the decal transfer method may have disadvantages, for example, that a large amount of subsidiary materials is used to prepare respective components and yields of respective processes are different, and thus manufacturing costs are high. Further, resistance is generated due to interfaces formed between respective components (a cathode, an anode, and an electrolyte membrane layer), which causes degradation in the performance and durability of a fuel cell. Still further, reduction in the thickness of an electrolyte membrane layer for cost savings and performance improvement, in turn, causes limitations in bonding of electrodes to the electrolyte membrane layer.

Meanwhile, with regard to the direct coating method, a catalyst slurry is directly coated on a polymer electrolyte membrane layer and is dried to form an anode, a release film (or a separate film) is removed from the opposite surface of the polymer electrolyte membrane layer, and a cathode is directly coated thereon and is dried. The direct coating method includes directly applying a cathode and an anode to both surfaces of an electrolyte layer.

However, in the direct coating method, an electrolyte layer may be rapidly expanded by water and an organic solvent contained in an electrode slurry directly coated thereon. When the solvent is removed through drying, the structure of the expanded ionomer becomes dense, which causes deformation (i.e. cracking) between a portion directly coated with an electrode slurry and a portion not coated therewith. For example, as an electrode is coated on one surface of an electrolyte membrane layer, a release film may be removed when another electrode is coated on the opposite surface of the electrolyte membrane layer. At this time, the electrolyte membrane layer may be greatly bent, and thus productivity is deteriorated. Further, the release film, which is removed from the catalyst electrode layer, may be pushed into a wrinkled form due to frictional force. At this time, a portion of the catalyst electrode layer may not be completely separated from the release film, but may remain coated on the release film, by which the surface of the catalyst electrode layer transferred to the polymer electrolyte membrane layer is microscopically deformed. Thus, the durability and performance of a fuel cell using a membrane-electrode assembly, manufactured by the conventional manufacturing method, may be deteriorated due to incomplete transfer and surface deformation of a catalyst electrode layer.

The above information disclosed in this Background section is only for enhancement of understanding of the background of the invention, and therefore it may contain information that does not form the prior art that is already known in this country to a person of ordinary skill in the art.

SUMMARY

In preferred aspects, provided is a method that may improve the performance and durability of a membrane-electrode assembly by minimizing the generation of an interface between layers in the membrane-electrode assembly.

Further, provided is a method that may reduce the occurrence of cracking in an electrode in a membrane-electrode assembly and structural deformation of the electrode, which may be caused when a release film (or release paper) is removed.

In addition, provided is a method that may improve productivity through a reduction in the number of processes, improve the performance of a fuel cell, and reduce manufacturing costs through realization of an ultra-thin-film-type membrane-electrode assembly.

However, the objects to be accomplished by the invention are not limited to the above-mentioned objects. The objects of the invention will be more apparent from the following description, and will be realized by means of the elements and combinations thereof pointed out in the appended claims.

In one aspect, the present invention provides a method of manufacturing a membrane-electrode assembly. The method may include forming a laminated structure including a release film, an anode layer, a porous support layer, and a cathode layer, and treating the laminated structure. The forming the laminated structure may include providing a release film; forming the anode layer by coating a first electrode slurry on a first surface of the release film; stacking the porous support layer on a surface of the anode layer; and forming the cathode layer by coating the second electrode slurry on a surface of the porous support layer.

The term "release film" as used herein refers to a material formed in film having a thickness micrometer range, for example, from about 1 μm to about 50 μm, and including a material that may be removable or peeled in part or whole from a final product, or when manufacturing processes are complete. Suitable release film includes, for example, materials that are formed from or include polyethylene terephthalate (PET), polyethylene naphthalate (PEN), polyimide (PI), polyoxymethylene (POM), polytetrafluoroethylene (PTFE), ethylenetetrafluoroethylene (EPFE), polyethylene (PE), polypropylene (PP), polycarbonate(PC), and the like.

The term "anode layer" as used herein refers to a layer including active anode material of a fuel cell assembly and formed in a thickness of micrometer range, for example, from about 1 μm to about 50 μm. Suitable anode layer includes, for example, active anode material that are formed from or include a catalyst including platinum (Pt), perfluorosulfonic acid (PFSA)-based ionomer and conventional additives.

The term "cathode layer" as used herein refers to a layer including active cathode material of a fuel cell assembly and formed in a thickness of micrometer range, for example, from about 1 μm to about 50 μm. Suitable cathode layer includes, for example, active cathode material that are formed from or include a catalyst including platinum (Pt), perfluorosulfonic acid (PFSA)-based ionomer and conventional additives.

The term "porous support layer" as used herein refers to a layer including porous structures (e.g., plurality of pores) and serving as a support between stacks of layers in a fuel cell assembly. The porous support layer may be formed to have a thickness of micrometer range, for example, from about 1 μm to about 50 μm. Suitable porous support layer includes, for example, expanded polytetrafluoroethylene (ePTFE).

The term "porous" as used herein refers to being a structure having a plurality of pores, spaces, or holes through which solid, liquid or gas (e.g., air) may pass or remain impregnated) within inside the object (e.g., layer or matrix). In certain embodiments, the pores, porous spaces, or holes may have a size ranging in nanometer scale (e.g., 1 nm to 100 nm) to micrometer scale (e.g., 1 μm to 10 μm, or preferable, 1 μm to 5 μm). In certain embodiments, the pores, porous spaces, or holes may be impregnated with the liquid, gas or solid particles (e.g., ionomer) having a size less than the size of the pore.

The laminated structure may be heat treated. For instance, the laminate structure may be treated by drying and/or thermally treating. The "thermally treating" as used herein refers to applying a heat to a treating area, or alternately refers to applying a heat to surrounding so as to directly applying the heat and increase a temperature of the area.

Each of the anode layer and the cathode layer may include a catalyst and an ionomer. For instance, the anode layer may include a first catalyst and a first ionomer, and the cathode layer may include a second catalyst and a second ionomer. The porous support layer may have a porous structure including a plurality of pores, and the catalyst may have a size greater than the size of the pores in the porous support layer.

The stacking the porous support layer on the surface of the anode layer may include forming an electrolyte support layer in such a manner that the ionomer on the surface of the anode layer that comes into contact with the porous support layer is impregnated into the pores in the porous support layer.

The forming the cathode layer may include forming an electrolyte membrane layer in such a manner that the ionomer on a surface of the cathode layer that comes into contact with the electrolyte support layer permeates into pores in the electrolyte support layer.

The forming the cathode layer may be performed by coating the second electrode slurry on a surface of the electrolyte support layer in a continuous coating manner or in a pattern coating manner.

The porous support layer may suitably include expanded polytetrafluoroethylene (ePTFE).

The laminated structure may be dried and then thermally treated.

The method may further include, before the forming the laminated structure, providing the first electrode slurry including the first catalyst and the first ionomer.

In the first electrode slurry, the content (wt %) of the first ionomer may be equal to or greater than the content (wt %) of the first catalyst.

Preferably, the content (wt %) of the first ionomer may be about 1.5 times or greater the content (wt %) of the first catalyst.

The method may further include, before the forming the laminated structure, preparing the second electrode slurry comprising the second catalyst and the second ionomer.

In the second electrode slurry, the content (wt %) of the second ionomer may be equal to or greater than the content (wt %) of the second catalyst.

The first ionomer of the anode layer and the second ionomer of the cathode layer may include the same type of ionomer.

The anode layer may have a size greater than the size of the cathode layer.

The porous support layer may have a size greater than the size of the anode layer.

In another aspect, the present invention provides a membrane-electrode assembly manufactured using the above-described manufacturing method. For instance, the membrane-electrode assembly may include a cathode layer, an anode layer, and an electrolyte membrane layer disposed between the cathode layer and the anode layer and impregnated with ionomers of the cathode layer and the anode layer.

Preferably, the membrane-electrode assembly may have a thickness ranging from about 10 to 50 μm.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Like reference numerals refer to like elements throughout the specification.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "includes," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element such as a layer, film, region, or plate is referred to as being "on" another element, it can be directly on the other element or intervening elements may also be present. It will be understood that when an element such as a layer, film, region, or plate is referred to as "under" another element, it can be directly under the other element or intervening elements may also be present.

Unless otherwise indicated, all numbers, values and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. For example, "about" can be understood as within 10%, 9%, 8%, 7%, 6%, 5%, 4%, 3%, 2%, 1%, 0.5%, 0.1%, 0.05%, or 0.01% of the stated value.

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

In the context of this specification, where a range is stated for a parameter, it will be understood that the parameter includes all values within the stated range, inclusive of the stated endpoints of the range. For example, a range of "5 to 10" will be understood to include the values 5, 6, 7, 8, 9, and 10 as well as any sub-range within the stated range, such as to include the sub-range of 6 to 10, 7 to 10, 6 to 9, 7 to 9, etc., and inclusive of any value and range between the integers which is reasonable in the context of the range stated, such as 5.5, 6.5, 7.5, 5.5 to 8.5 and 6.5 to 9, etc. For example, a range of "10% to 30%" will be understood to include the values 10%, 11%, 12%, 13%, and all integers up to and including 30%, as well as any sub-range within the stated range, such as to include the sub-range of 10% to 15%, 12% to 18%, 20% to 30%, etc., and inclusive of any value and range between the integers which is reasonable in the context of the range stated, such as 10.5%, 15.5%, 25.5%, etc.

Hereinafter, exemplary embodiments of the present invention will be described in detail with reference to the accompanying drawings.

Figure 1:
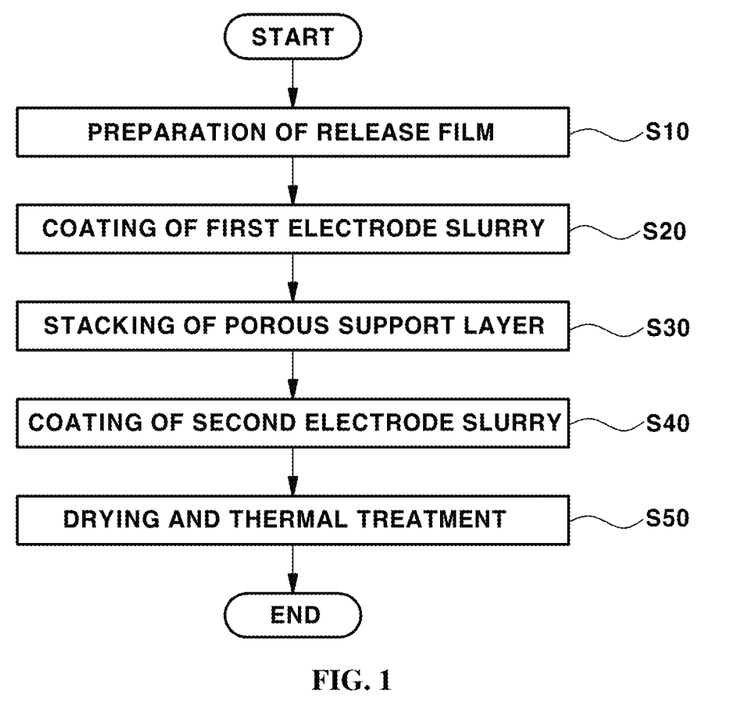
FIG. 1 is a flowchart showing an exemplary method of manufacturing an exemplary membrane-electrode assembly according to an exemplary embodiment of the present invention.
Figure 2:
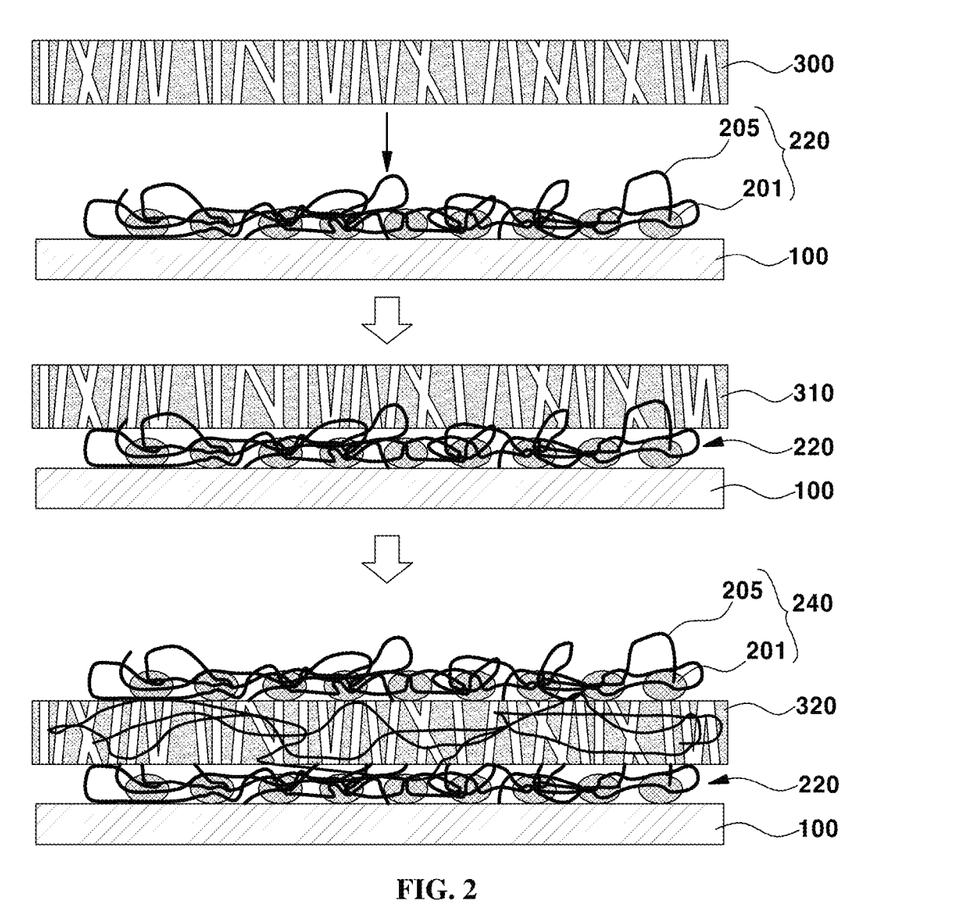
FIG. 2 illustrates processes of an exemplary method of manufacturing an exemplary membrane-electrode assembly according to an exemplary embodiment of the present invention.

FIG. 1 is a flowchart showing an exemplary method of manufacturing an exemplary membrane-electrode assembly (MEA) according to an exemplary embodiment of the present invention, and FIG. 2 illustrates processes of an exemplary method of manufacturing v membrane-electrode assembly according to an exemplary embodiment of the present invention.

The method of manufacturing a membrane-electrode assembly according to an exemplary embodiment of the present invention may include a step of forming a laminated structure (S10 to S40) and a step of treating, for example, drying and thermally treating, the laminated structure (S50). For instance, the step of forming the laminated structure may include a step of preparing a release film (S10), a step of forming an anode layer by coating a first electrode slurry on a first surface of the release film (S20), a step of stacking a porous support layer on a surface of the anode layer (S30), and a step of forming a cathode layer by coating a second electrode slurry on a surface of the porous support layer (S40).

Unlike the conventional membrane-electrode assembly manufacturing method, in which at least three release films are used, in the step S10 to S40 of forming the laminated structure according to an exemplary embodiment of the present invention, the release films may not be used in every step S10 to S40, but a single release film may be used only in the step S10 to form the laminated structure. Therefore, the manufacturing process may be simplified, the amount of subsidiary materials used in the manufacturing process may be reduced, and the manufacturing process may be continuously performed.

Further, in the related art, because the processes of forming respective layers have different yields from each other, the productivity of a membrane-electrode assembly manufactured using the layers may be low. However, the membrane-electrode assembly manufacturing method according to various exemplary embodiments of the present invention may include less processes, and thus exhibits superior productivity.

The step S40 of forming the cathode layer may be performed by coating the second electrode slurry on the porous support layer in a continuous coating manner or in a pattern coating manner, without being limited thereto. Any one of various other coating methods may be used.

Particularly, the method may include drying to remove a solvent after the step S10 to S40 of forming the laminated structure. In a related art, the conventional membrane-electrode assembly manufacturing method (e.g. the decal transfer method) may include a drying process performed in the middle of the step of forming a laminated structure. Preferably, the drying process (S50) may be performed after forming the laminated structure (S20 to S40).

Thus, bonding process (i.e. coating or stacking) may not be hindered by contraction or expansion of ionomers contained in the respective layers. For instance, in the steps S20 to S40 of forming the respective layers, since the layers are already in a wet state, ionomers contained in the respective layers may be in an expanded state, and accordingly, the layers may be packed (or stacked) without generation of interface resistance. In contrast, in the conventional membrane-electrode assembly manufacturing method, ionomers dispersed in the respective layers are in the state of being expanded in a bulky form, and get tangled in a complicated chain form when dried. Thus, when the ionomers are repeatedly wetted and dried according to an exemplary embodiment, fine spaces may be formed in the interfaces between the respective layers, and thus interface resistance may be increased.

Accordingly, when the respective layers are individually dried as the conventional method, the structure of each layer may be deformed, fine spaces may be formed between the layers, and interface resistance may be generated, leading to degradation of the performance and durability of a membrane-electrode assembly. However, according to various exemplary embodiments of the present invention, since a laminated structure is dried once without the necessity to perform drying at every layer-forming step, structural deformation of each layer and resistance (i.e. interface resistance) in the thickness direction thereof are reduced, which leads to improvement of the performance and durability of a membrane-electrode assembly, and consequently a thin-film-type or ultra-thin-film-type membrane-electrode assembly may be obtained. In addition, the amount of subsidiary materials used in each process may be reduced and the number of drying processes is reduced, and consequently productivity is improved.

Particularly, the conventional direct coating method (or the multilayer coating method) in the related art has a problem in that layers are more likely to be cracked or wrinkled due to contraction and expansion thereof, whereas the membrane-electrode assembly manufacturing method according to various exemplary embodiments of the present invention may substantially reduce the generation of cracking or wrinkles. For instance, since the electrode structures formed by coating the electrode slurry in a fluid state (S20 and S40) are dried together, the electrode structures may be evenly contracted and expanded, leading to a reduction in the generation of cracking or wrinkles. As a result, the quality, performance and durability of the membrane-electrode assembly may be improved.

Meanwhile, according to the membrane-electrode assembly manufacturing method according to an exemplary embodiment of the present invention, in the step S50 of drying and thermally treating the laminated structure, the laminated structure may be thermally treated after being dried. However, the present invention is not limited thereto. Alternatively, the laminated structure may be dried and thermally treated at the same time. The thermal treatment process may cause the layers of the laminated structure to be sufficiently bonded to each other.

Hereinafter, the processes of the method of manufacturing a membrane-electrode assembly according to an exemplary embodiment of the present invention will be described in detail with reference to FIG. 2.

As shown in FIG. 2, in the processes of forming the laminated structure (refer to S10 to S40 in FIG. 1) according to an exemplary embodiment of the present invention, each of the anode layer 220 and the cathode layer 240 may include a catalyst 201 and an ionomer 205, and the porous support layer 300 may have a porous structure, in which a plurality of pores may be formed. For instance, the anode layer may include a first catalyst and a first ionomer and the cathode layer may include a second catalyst and a second ionomer. The size of the catalyst 201 (e.g., the first and second catalysts) may be greater than that of the pores in the porous support layer 300.

After the step S20 of forming the anode layer 220 on one surface of the release film 100, in the step S30 of stacking the porous support layer 300 on the surface of the anode layer 220, the ionomer 205 on the surface of the anode layer 220 that comes into contact with the porous support layer 300 may be impregnated into the pores in the porous support layer 300. Particularly, since the porous support layer 300 is disposed on the anode layer 220, a portion of the ionomer 205 of the anode layer 220 may be absorbed into the pores in the porous support layer 300 by the capillary phenomenon. As such, the ionomer 205 of the anode layer 220 may be impregnated, for instance, the first ionomer of the anode layer 220 may be impregnated. As a result, an electrolyte support layer 310, into which a portion of the ionomer 205 of the anode layer 220 is impregnated, may be formed.

The release film 100 may comprise polyethylene terephthalate (PET), polyethylene naphthalate (PEN), polyimide (PI), polyoxymethylene (POM), polytetrafluoroethylene (PTFE), ethylene tetra fluoro ethylene (ETFE), polyethylene (PE), polypropylene (PP), polycarbonate (PC) or combination thereof.

Meanwhile, because the size of the catalyst 201 included in the anode layer 220 is greater than that of the pores in the porous support layer 300, the catalyst 201 cannot move into the porous support layer 300 from the anode layer 220.

In the step S40 of forming the cathode layer 240, the ionomer 205 on the surface of the cathode layer 240 that comes into contact with the electrolyte support layer 310 may permeate into the pores in the electrolyte support layer 310. Particularly, a portion of the ionomer 205 of the cathode layer 240 may be absorbed into the pores in the electrolyte support layer 310 by the surface tension such that the ionomer 205 of the cathode layer 240 may be permeated, for example, the second ionomer may be permeated. As a result, an electrolyte membrane layer 320, into which a portion of the ionomer 205 of the cathode layer 240 permeates, may be formed. As described above, the step S40 of forming the cathode layer may be performed, for example, by coating the second electrode slurry on the electrolyte support layer 310 in a continuous coating manner or in a pattern coating manner.

A portion of the ionomer 205, which does not permeate into the electrolyte support layer 310 but is left behind, may serve as an ionomer of the electrode between the cathode layer 240 and the electrolyte membrane layer 320. In addition, since the size of the catalyst 201 included in the cathode layer 240 is greater than that of the pores in the electrolyte support layer 310, the catalyst 201 cannot move into the electrolyte support layer 310 from the cathode layer 240, but only the ionomer 205 may selectively permeate into the electrolyte support layer 310.

In particular, the ionomer 205, which permeates into the electrolyte support layer 310 to form the electrolyte membrane layer 320 in the step S40 of forming the cathode layer 240, may come into contact with the ionomer 205 impregnated into the electrolyte support layer 310 formed in the step S30 of stacking the porous support layer 300 on the surface of the anode layer 220. Accordingly, the pores in the porous support layer 300 may be filled with the ionomer 205 derived from each of the anode layer 220 and the cathode layer 240, by which the electrolyte membrane layer 320 impregnated with the ionomer 205 may be formed.

Meanwhile, the porous support layer 300 according to an exemplary embodiment of the present invention may include expanded polytetrafluoroethylene (ePTFE). As such, since the electrolyte membrane layer 320 included in the laminated structure prepared in accordance with the above-described forming processes (i.e. steps in S10 to S40 in FIG. 1) may include expanded polytetrafluoroethylene (ePTFE), the tensile strength of the membrane-electrode assembly may be increased, and variation in the dimensions thereof may be prevented.

Meanwhile, in order to improve the durability of the fuel cell, the porous support layer 300, the electrolyte support layer 310 or the electrolyte membrane layer 320 may not exclude materials other than expanded polytetrafluoroethylene (ePTFE).

Figure 3:
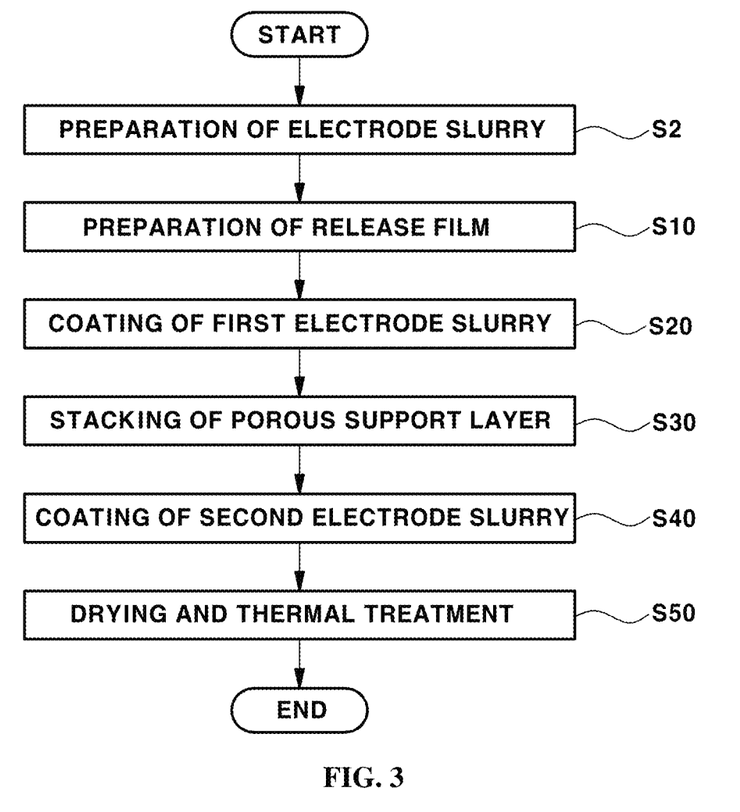
FIG. 3 is a flowchart showing an exemplary method of manufacturing an exemplary membrane-electrode assembly according to an exemplary embodiment of the present invention.
Figure 4:
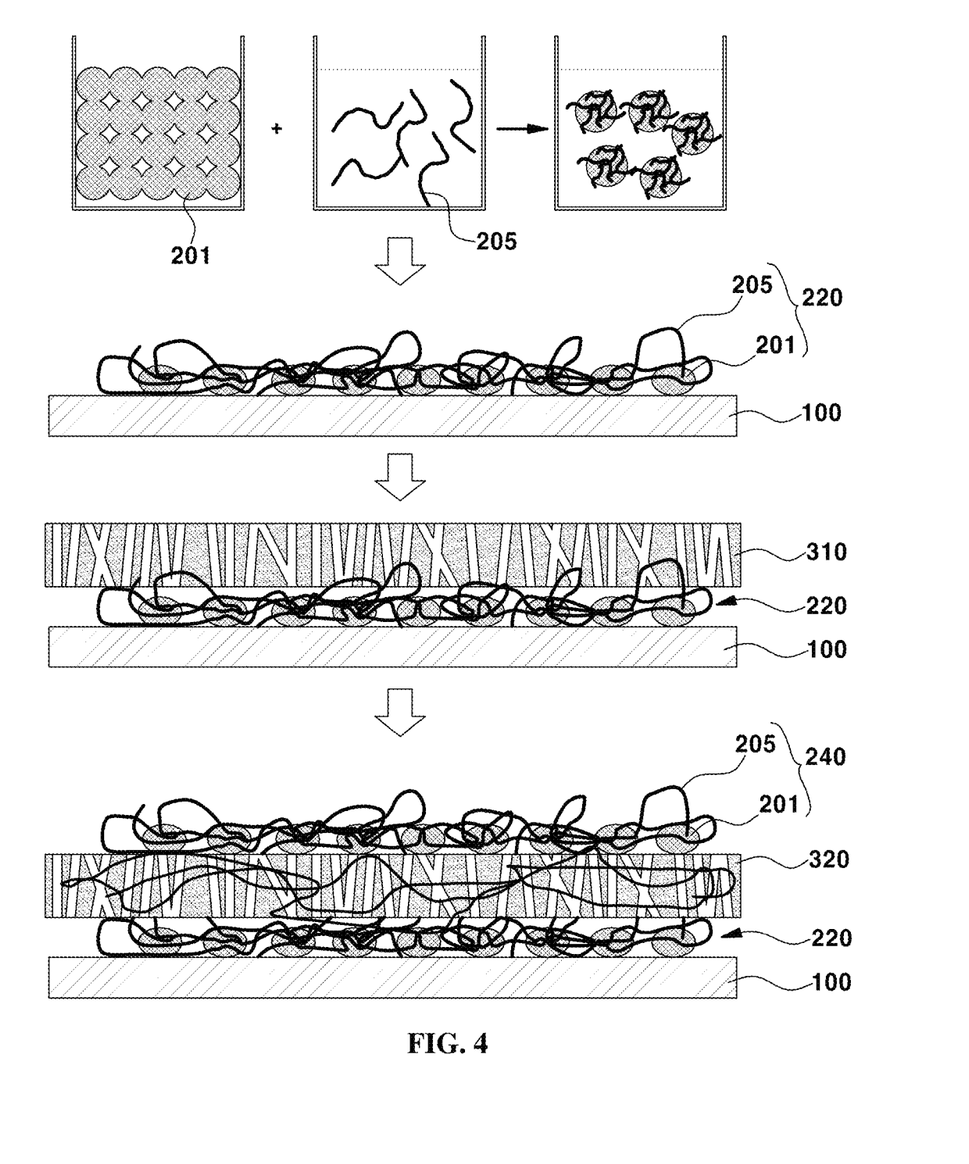
FIG. 4 illustrates processes of an exemplary method of manufacturing an exemplary membrane-electrode assembly according to an exemplary embodiment of the present invention.

FIG. 3 is a flowchart showing a method of manufacturing a membrane-electrode assembly (MEA) according to another exemplary embodiment of the present invention, and FIG. 4 illustrates processes of an exemplary method of manufacturing an exemplary membrane-electrode assembly according to another exemplary embodiment of the present invention. For convenience of description, the following description will focus on differences from the embodiment described with reference to FIGS. 1 and 2.

As shown in FIG. 3, the method may further include, before a step S10 to S40 of forming a laminated structure according to another embodiment of the present invention, a step of preparing an electrode slurry by mixing and dispersing a catalyst and an ionomer (S2). The step S2 of preparing the electrode slurry may include a step of preparing a first electrode slurry. Alternatively, in a further embodiment of the present invention, the step S2 of preparing the electrode slurry may include a step of preparing a first electrode slurry and a step of preparing a second electrode slurry. However, the present invention is not limited thereto. For example, before the formation of a laminated structure (S10 to S40), a first electrode slurry may be prepared by mixing and dispersing a first catalyst and a first ionomer (S20), and a porous support layer may be stacked on the surface of the anode layer (S30). Subsequently, a cathode layer may be formed by coating a second electrode slurry, prepared by mixing and dispersing a second catalyst and a second ionomer, on the electrolyte support layer (S40).

Unlike the conventional membrane-electrode assembly manufacturing method (e.g. the decal transfer method or the direct coating method), in which the formation of layers requires at least three solvent dispersion processes, including dispersion of an electrode slurry to form a cathode layer, dispersion of an electrode slurry to form an anode layer and dispersion of an ionomer to form an electrolyte membrane layer, a membrane-electrode assembly may be manufactured through two solvent dispersion processes (e.g. preparation of the first electrode slurry and preparation of the second electrode slurry). Therefore, the number of processes may be reduced, and thus productivity may be improved. In addition, the amount of subsidiary materials used in each process may be reduced, and thus manufacturing costs may be reduced.

As shown in FIG. 4, the membrane-electrode assembly manufacturing method according to another exemplary embodiment of the present invention may further include, before the step of forming the anode layer 220 on a first surface of the prepared release film 100, a step of preparing an electrode slurry by mixing and dispersing a catalyst 201 (e.g., first catalyst) and an ionomer 205 (e.g., first catalyst, as referred to S2 in FIG. 3).

Preferably, in the first electrode slurry may include a content (wt %) of the first ionomer 205 equal to or greater than the content (wt %) of the first catalyst 201. For example, the anode layer 220 may be formed such that a greater amount of the ionomer 205 is included in the first electrode slurry than the catalyst 201. Preferably, the content (wt %) of the ionomer 205 (e.g., first ionomer) may be 1.5 times or greater than the content (wt %) of the catalyst 201 (e.g., first catalyst).

Specifically, the first electrode slurry comprises the first catalyst in amount of 20 wt % to 50 wt %, preferably 40 wt % to 50 wt %, and the first ionomer in amount of 50 wt % to 80 wt %, preferably 50 wt % to 60 wt %.

As described above, in a further embodiment of the present invention, before the step of forming the laminated structure (S10 to S40), a step of preparing a second electrode slurry by mixing and dispersing a catalyst 201 (e.g., second catalyst) and an ionomer 205 (e.g., second ionomer) may also be performed.

In the second electrode slurry, the content (wt %) of the ionomer 205 (e.g., second ionomer) may be equal to or greater than the content (wt %) of the catalyst 201 (e.g., second catalyst). Preferably, in the second electrode slurry, the ratio of the content (mol) of the ionomer 205 (e.g., second ionomer) to the content (mol) of the catalyst 201 (e.g., second catalyst) may be about 1:1, or a greater amount of the ionomer 205 (e.g., second ionomer) may be included than the catalyst 201 (e.g., second catalyst).

Specifically, the second electrode slurry comprises the second catalyst in amount of 20 wt % to 50 wt %, preferably 40 wt % to 50 wt %, and the second ionomer in amount of 50 wt % to 80 wt %, preferably 50 wt % to 60 wt %.

Figure 5:
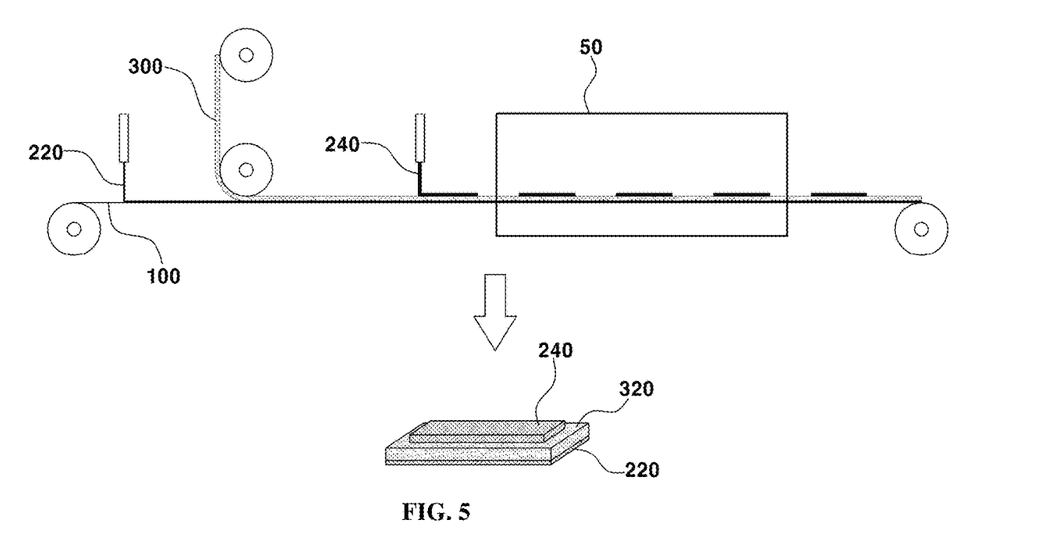
FIG. 5 is a view showing an exemplary apparatus for manufacturing the membrane-electrode assembly according to the embodiments of the present invention.

FIG. 5 illustrates an exemplary apparatus for manufacturing the membrane-electrode assembly according to exemplary embodiments of the present invention.

As shown in FIG. 5, as described above, the laminated structure may be formed using the membrane-electrode assembly manufacturing method according to various exemplary embodiments of the present invention, i.e. by performing the step of forming the anode layer 220 by coating the first electrode slurry on a first surface of the prepared release film 100 (S10 and S20 in FIG. 1), the step of forming the electrolyte support layer (to 310 in FIG. 4) by stacking the porous support layer 300 (e.g. ePTFE) on the surface of the anode layer 220 (S30 in FIG. 1) and the step of forming the cathode layer 240 and the electrolyte membrane layer (320 in FIG. 4) by coating the second electrode slurry on the surface of the electrolyte support layer 310 (refer to S40 in FIG. 1). Subsequently, the laminated structure may be moved to a drying furnace 50 and may be dried (S50 in FIG. 1) while passing through the drying furnace 50. In addition, during the drying process, thermal treatment may also be performed in order to solidify the bonding between the layers 220, 240 and 320 (S50).

Thus, the laminated structure 220, 240 and 320 may be formed using a smaller amount of the release film 100 (S10) without the necessity to use the release film at every step S10 to S40. Accordingly, the manufacturing process may be simplified, and the amount of subsidiary materials used in each process may be reduced.

In addition, as shown in FIG. 5, since it is not necessary to individually prepare the respective layers 220, 240 and 320 and to bond the layers to each other, the membrane-electrode assembly manufacturing process may be continuously performed.

The membrane-electrode assembly manufactured in accordance with various exemplary embodiments of the present invention comprises the anode layer 220, the cathode layer 240 and the electrolyte membrane layer 320 interposed between the anode layer 220 and the cathode layer 240.

The anode layer 220 may be formed using the first electrode slurry. The anode layer 220 comprises the first catalyst, the first ionomer and conventional additives such as an antioxidant. The first catalyst comprises carbon-supported Pt catalyst (Pt/C). The first ionomer comprises PFSA-based ionomer. The anode layer 220 comprises the first catalyst in amount of 20 wt % to 50 wt %, the first ionomer in amount of 50 wt % to 80 wt %, and a small amount of additives. The anode layer 220 has electrical conductivity since it comprises more than 20 wt % of the first catalyst. And the anode layer 220 breaks down hydrogen gas supplied from the outside into proton and electrons.

The cathode layer 240 may be formed using the second electrode slurry. The cathode layer 240 comprises the second catalyst, the second ionomer and conventional additives such as an antioxidant. The second catalyst comprises carbon-supported Pt catalyst (Pt/C). The second ionomer comprises PFS A-based ionomer. The cathode layer 240 comprises the second catalyst in amount of 20 wt % to 50 wt %, the second ionomer in amount of 50 wt % to 80 wt %, and a small amount of additives. The cathode layer 240 has electrical conductivity since it comprises more than 20 wt % of the second catalyst. The cathode layer 240 reacts oxygen gas supplied from the outside with proton delivered from the anode layer 220 to produce water.

The electrolyte membrane layer 320 is electrically insulated. The electrolyte membrane layer 320 moves the proton produced by the anode layer 220 to the cathode layer 240.

In the membrane-electrode assembly manufactured in accordance with the embodiments of the present invention, the anode layer 220 and the cathode layer 240 may include the same type of ionomer, for example, the first ionomer and the second ionomer may be the same type ionomer. Accordingly, the electrolyte membrane layer 320 may include the same type of ionomer as the ionomer of the anode layer 220 and the cathode layer 240. However, in order to improve the performance of the membrane-electrode assembly, the inclusion of other types of ionomers is not precluded.

In addition, as shown in FIG. 5, in the membrane-electrode assembly manufactured in accordance with various exemplary embodiments of the present invention, the anode layer 220 may be larger than the cathode layer 240, for example, a planar area of the anode layer may be larger than a planar area of the cathode layer. The porous support layer 300 (e.g. ePTFE) may be larger than the anode layer 220, for example, a planar area of the porous support layer may be larger than a planar area of the anode layer. In other words, the porous support layer 300 (e.g. ePTFE), which is relatively inexpensive and is easy to obtain, may be formed to have the largest area (planar area), and the anode layer 220 and the cathode layer 240, which include precious metals (e.g. platinum (Pt)) or rare earth elements, may be formed to be relatively small. In addition, by forming the cathode layer 240 to be smaller than the anode layer 220, the amount of precious metals (e.g. platinum (Pt)) that are used is further reduced, and consequently, the cost of manufacturing the membrane-electrode assembly may be reduced.

In addition, as described above, in the membrane-electrode assembly manufactured in accordance with various exemplary embodiments of the present invention, since the generation of the interface between the layers 220, 240 and 320 is minimized, the membrane-electrode assembly may have an overall thickness ranging from about 10 to 50 μm. In addition, a thin-film-type or ultra-thin-film-type membrane-electrode assembly having an overall thickness of about 15 μm or less, or particularly, ranging from about 10 to about 15 μm, may be manufactured.

Figure 6A:
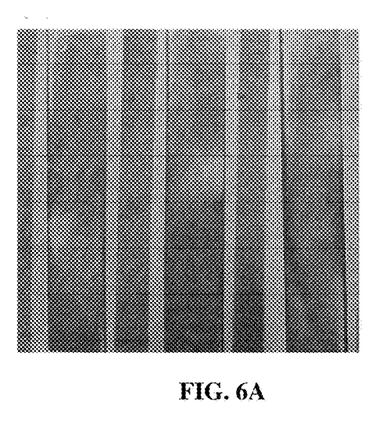
FIGS. 6A and 6B shows electrodes in a membrane-electrode assembly manufactured in accordance with the decal transfer method in the related art.
Figure 6B:
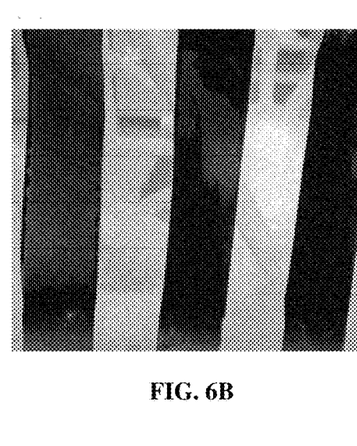

FIGS. 6A and 6B are views showing electrodes in a membrane-electrode assembly manufactured in accordance with the conventional decal transfer method.

FIG. 6A shows the surface of an electrolyte membrane layer before an electrode layer (an anode layer or a cathode layer) is coated in accordance with the decal transfer method. In FIG. 6A, the surfaces of the electrolyte membrane layers having thicknesses of 10 μm, 15 μm and 20 μm, respectively, are sequentially shown from the left side.

FIG. 6B shows the result of transferring an electrode layer to the surface of each of the electrolyte membrane layers shown in FIG. 6A through the decal transfer method. It is confirmed from FIG. 6A that an electrode non-transferred region (a light-colored portion) was generated. In particular, in an experiment in which an electrode was thermally compressed onto the surface of an electrolyte membrane layer having a thickness of 10 μm, most of the electrode was not bonded to the electrolyte membrane layer. In an experiment in which an electrode was thermally compressed onto the surface of an electrolyte membrane layer having a thickness of 15 μm, most of the electrode was not bonded to the electrolyte membrane layer, but the transfer of the electrode was slightly improved compared to the transfer of the electrode to the electrolyte membrane layer having a thickness of 10 μm. Accordingly, when an electrode is thermally compressed onto the surface of an electrolyte membrane layer having a thickness of 20 μm or greater, most of the electrode is bonded to the electrolyte membrane layer without the generation of a non-transferred region. Thus, the decal transfer method is not capable of manufacturing a membrane-electrode assembly having a thickness of 20 μm or less. However, the membrane-electrode assembly manufacturing method according to various exemplary embodiments the present invention may manufacture a membrane-electrode assembly having a thickness of about 15 μm or less, preferably, about 10 μm or less, while ensuring the performance of the membrane-electrode assembly. As a result, a thin-film-type or ultra-thin-film-type membrane-electrode assembly may be manufactured.

Accordingly, in the conventional decal methods, when the respective layers are individually dried, the structure of each layer is deformed, fine spaces are formed between the layers, and interface resistance is generated. In contrast, according to various exemplary manufacturing methods of the present invention, since an entire laminated structure is dried without the necessity to perform drying at every layer-forming step, structural deformation of each layer and resistance (i.e. interface resistance) in the thickness direction thereof are reduced, thereby manufacturing a securely bonded membrane-electrode assembly. The membrane-electrode assembly manufactured in this manner may have improved performance and durability. In addition, the number of drying processes may be reduced, and thus productivity may be improved. In addition, the amount of subsidiary materials used in each process may be reduced, thereby attaining an economic effect, i.e. a reduction in manufacturing costs.

As consequence, occurrence of an interface between layers in a membrane-electrode assembly may be minimized, and a large amount of ionomer included in an anode layer may be impregnated into an electrolyte layer, thereby improving the performance and durability of a fuel cell and consequently realizing an ultra-thin-film-type membrane-electrode assembly.

In addition, the occurrence of cracking in an electrode in a membrane-electrode assembly may be reduced, manufacturing costs are reduced by minimizing the amount of release film used in the manufacturing process, and structural deformation of the electrode, which may be caused when a release film is removed, may be reduced.

In addition, improvement of productivity and energy savings may be achieved by a reduction in the number of processes, and a reduction in manufacturing costs and improvement of the performance of a fuel cell may be achieved by realization of an ultra-thin-film-type membrane-electrode assembly.

It will be appreciated by those skilled in the art that the effects achievable through the invention are not limited to those that have been particularly described hereinabove, and other effects of the invention will be more clearly understood from the above detailed description.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane-electrode assembly, comprising:
   forming a laminated structure comprising a release film, an anode layer, a porous support layer, and a cathode layer; and
   treating the laminated structure,
   wherein the forming the laminated structure comprises:
   (i) providing the release film;
   (ii) forming the anode layer by coating a first electrode slurry on a first surface of the release film;
   (iii) stacking the porous support layer on a surface of the anode layer; and
   (iv) forming the cathode layer by coating a second electrode slurry on a surface of the porous support layer,
   wherein the stacking the porous support layer on the surface of the anode layer comprises forming an electrolyte support layer in such a manner that the first ionomer on a surface of the anode layer that comes into contact with the porous support layer is impregnated into the pores in the porous support layer,
   wherein the forming the cathode layer comprises forming an electrolyte membrane layer in such a manner that the second ionomer on a surface of the cathode layer that comes into contact with the electrolyte support layer permeates into pores in the electrolyte support layer,
   wherein the laminated structure is dried after forming the laminated structure and the laminated structure is formed withouth drying in the steps of (ii) and (iv).

2. The method of claim 1, wherein the anode layer comprises a first catalyst and a first ionomer, and the cathode layer comprises a second catalyst and a second ionomer,
   wherein the porous support layer has a porous structure comprising a plurality of pores, and
   wherein the first catalyst or the second catalyst has a size greater than a size of the pores in the porous support layer.

3. The method of claim 1, wherein the forming the cathode layer is performed by coating the second electrode slurry on a surface of the electrolyte support layer in a continuous coating manner or in a pattern coating manner.

4. The method of claim 1, wherein the porous support layer comprises expanded polytetrafluoroethylene (ePTFE).

5. The method of claim 1, wherein in the treating of the laminated structure, the laminated structure is dried and then thermally treated.

6. The method of claim 1, further comprising: before the forming the laminated structure, providing the first electrode slurry comprising the first catalyst and an ionomer.

7. The method of claim 6, wherein the first electrode slurry is prepared by mixing the catalyst and the ionomer.

8. The method of claim 7, wherein, in the first electrode slurry, a content (wt %) of the ionomer is equal to or greater than a content (wt %) of the catalyst.

9. The method of claim 6, further comprising: before the forming the laminated structure,
   providing the second electrode slurry comprising a second catalyst and a second ionomer.

10. The method of claim 9, wherein the second electrode slurry is prepared by mixing the second catalyst and the second ionomer.

11. The method of claim 9, wherein, in the second electrode slurry, a content (wt %) of the ionomer is equal to or greater than a content (wt %) of the catalyst.

12. The method of claim 9, wherein the first ionomer of the anode layer and the second ionomer of the cathode layer comprise a same type of ionomer.

13. The method of claim 9, wherein the porous support layer has a size greater than the size of the anode layer.

14. The method of claim 6, wherein the anode layer has a size greater than a size of the cathode layer.

* * * * *